Figure 1:
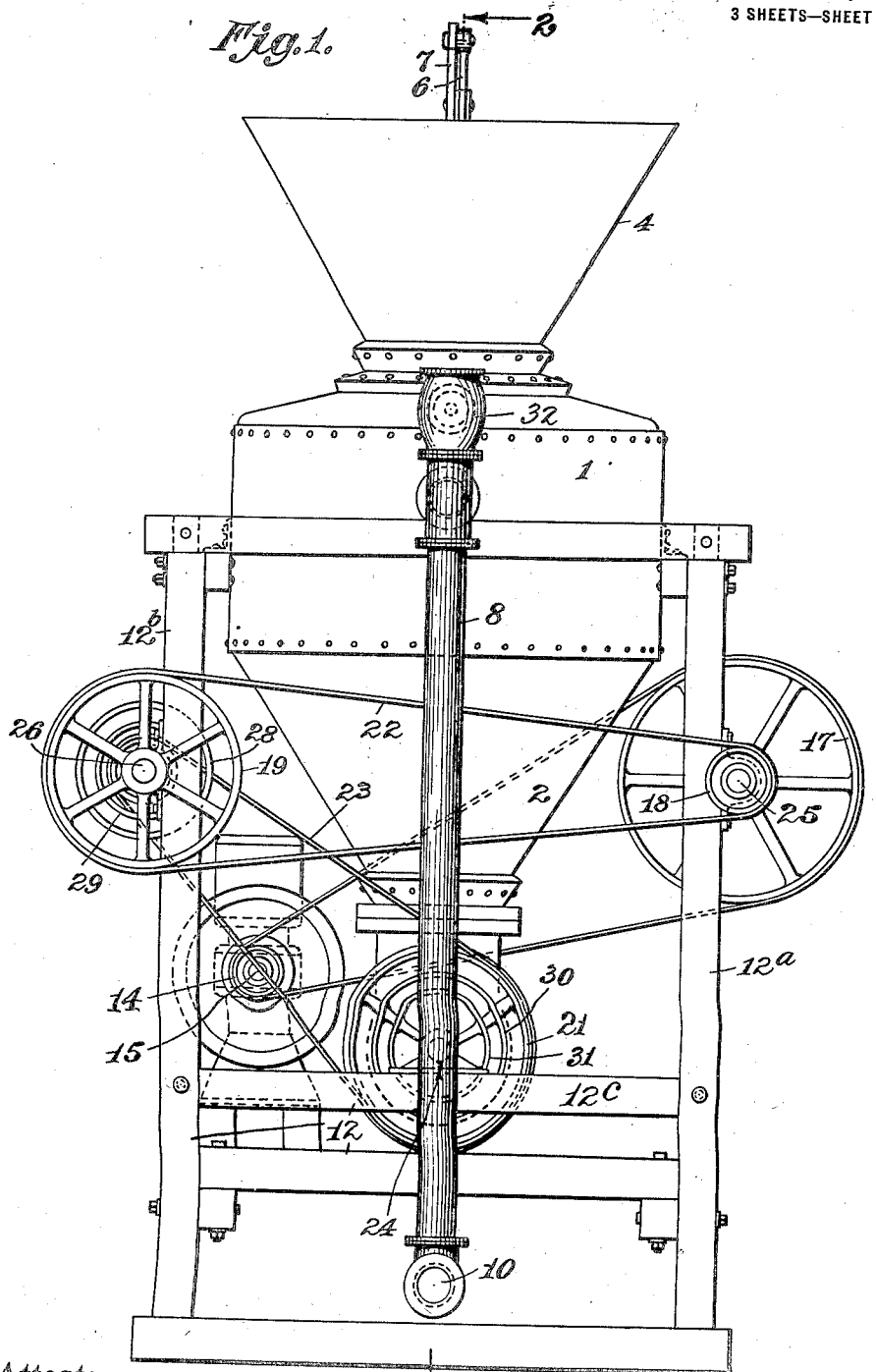

L. H. EICHELBERGER.
CONCRETE MIXING AND DISTRIBUTING APPARATUS.
APPLICATION FILED SEPT. 15, 1916.

1,379,174.

Patented May 24, 1921.
3 SHEETS—SHEET 1.

L. H. EICHELBERGER.
CONCRETE MIXING AND DISTRIBUTING APPARATUS.
APPLICATION FILED SEPT. 15, 1916.
1,379,174.
Patented May 24, 1921.
3 SHEETS—SHEET 3.
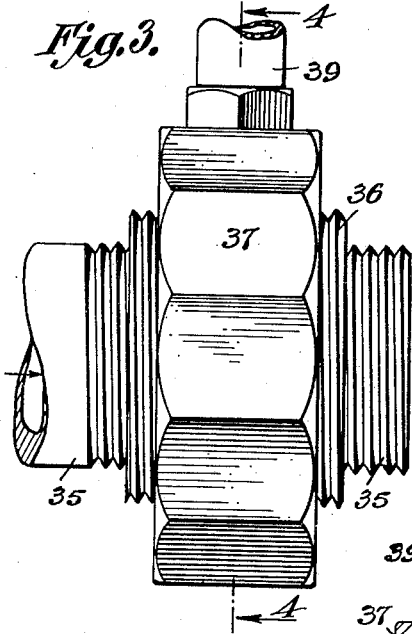
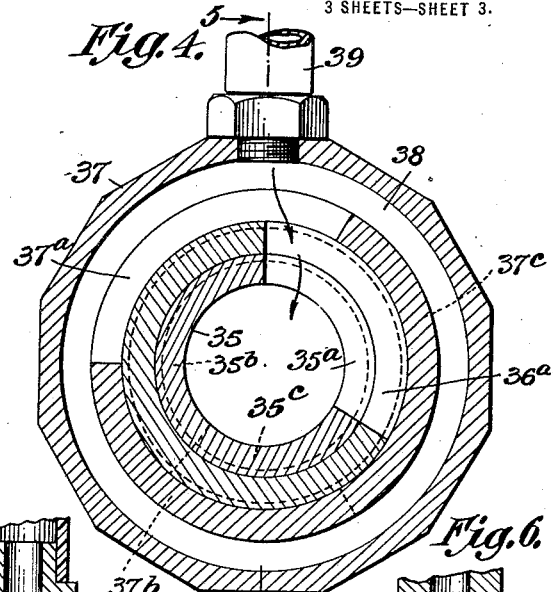
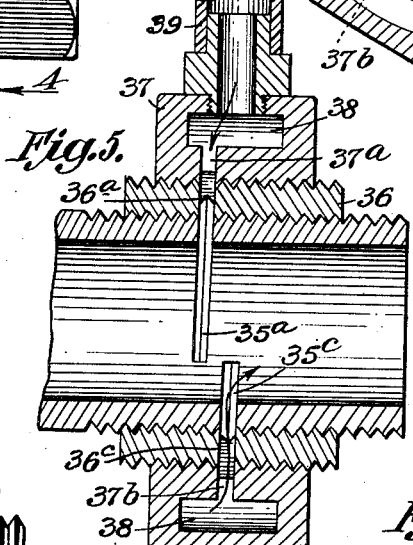
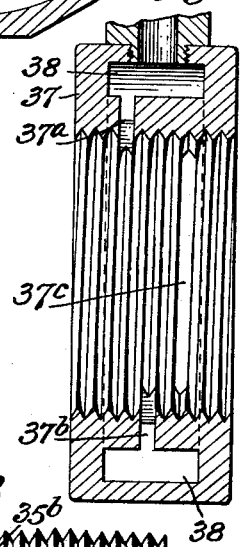
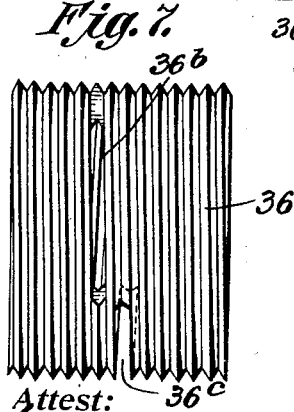
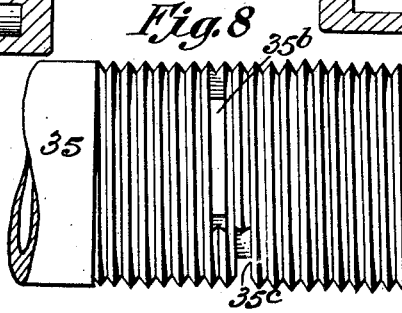
Attest:
Inventor:
Lewis H. Eichelberger
by S. J. Cox.
Atty.

UNITED STATES PATENT OFFICE.

LEWIS H. EICHELBERGER, OF PLAINFIELD, NEW JERSEY, ASSIGNOR TO RANSOME CONCRETE MACHINERY COMPANY, OF NEW YORK, N. Y., A CORPORATION OF NEW YORK.

CONCRETE MIXING AND DISTRIBUTING APPARATUS.

1,379,174.  Specification of Letters Patent.  Patented May 24, 1921.

Application filed September 15, 1916. Serial No. 120,221.

*To all whom it may concern:*

Be it known that I, LEWIS H. EICHELBERGER, a citizen of the United States, and a resident of the city of Plainfield, in the county of Union, State of New Jersey, have invented certain new and useful Improvements in Concrete Mixing and Distributing Apparatus, of which the following is a specification.

The improvements relate to apparatus for mixing and distributing concrete, and particularly to apparatus in which a combination of air under pressure and mechanical devices are employed. In this apparatus the materials are placed in a retort in a mixed or partly mixed state, and without moisture, and are then subjected to air pressure and discharged from the retort thereby and by the action of a measuring and propelling device, after which they are subjected to a current of air of high velocity and conveyed through a conduit, in the passage of which they are subjected to the action of peripheral jets of water. By this arrangement the concrete aggregates may be mixed mechanically or by the action of air outside of or within the retort, in a dry state, and discharged from such retort at a fixed rate, so that by regulating the rate of high velocity air flow the aggregates after passing from the retort are subjected to the proper volume of air at the proper velocity and in a manner calculated to produce the most effective mixing and conveying. These operations also bring the mixture to such a state and propel it through the conduit at such a rate that when the peripheral jets of water are directed thereinto the saturation will be thorough whether a relatively wet or a relatively dry mixture is desired.

To these ends the apparatus is provided with a series of pulleys, operated from a main driving shaft and the compressed air conduit is provided with two branches, one leading into the retort and the other leading to the discharge nozzle of the retort, so that the speed of the measuring discharge propeller may be regulated to discharge the aggregates at varying rates as desired, with relation to the rate and pressure of air supply, and the air supply may be also regulated to the rate of discharge. The extra pulleys shown in the drawing however can be dispensed with, and the gearing simplified when it is known at what rate the aggregates are to be discharged, or variations in the discharge may be brought about by regulation of the engine or by some other device. The water supply to the placing conduit is also regulated, without having its character or its direction in respect to the flow of the aggregates through the conduit changed. This is brought about by the peculiar arrangement of the water regulator and spray hereinafter described.

The improvements are illustrated in the accompanying drawings, referred to herein, in which Figure 1 is a side elevation of an apparatus embodying the improvements; Fig. 2 is a vertical section of the same on the line 2—2 of Fig. 1, looking in the direction indicated by the arrows; Fig. 3 is a side elevation of the water jet and regulating device; Fig. 4 is a vertical cross-section of the same taken on the line 4—4 of Fig. 3 and looking in the direction indicated by the arrow; Fig. 5 is a longitudinal section of the same taken on the line 5—5 of Fig. 4 and looking in the direction indicated by the arrow; Fig. 6 is a similar view of the inner parts enlarged with the said parts adjusted to a different position; Fig. 7 is a side elevation of the threaded and slotted collar surrounding the conduit at the point of the water supply; Fig. 8 is a similar view of the conduit itself at that point.

The vessel 1 has a contracted funnel-like lower portion 2 provided with a discharge opening 3, and a charging hopper 4 having a gate 5 where it enters the vessel and operated by a pivoted handle 6 through a link 7. Air is supplied to this vessel or retort from the air supply pipe 8 through a branch pipe 9, and another branch pipe 10 connected therewith supplies air at high velocity to the mouth of the outlet channel.

An engine 11 mounted in the frame 12 adjacent to the vessel 1 supplies power to the delivery propeller 13 through the pulley 14 on its shaft 15, the belt 16 and reducing pulleys 17, 18, 19, 20 and 21, these pulleys being operatively connected by the belts 22 and 23 and the last named pulley being keyed on the shaft 24 of the worm or propeller conveyer. The pulleys 17 and 18 are mounted on a shaft 25 journaled in the upright 12ª of the frame and the pulleys 19 and 20 on the shaft 26 journaled in the upmunicating with said retort, mechanical means for positively discharging said materials from said retort and regulating the rate of discharge of the same, a conduit into which said materials are discharged by said means, a conveying conduit communicating with the last named conduit, and a second conduit for fluid under pressure communicating therewith and constructed to project said fluid under pressure against the materials as they pass into said second conduit and to propel them along the same, said two fluid conduits being in open communication.

4. The combination of a retort provided with inlet and outlet openings for loose materials, means for closing said inlet opening, a conduit for fluid under pressure communicating with said retort, mechanical means for positively discharging said materials from said retort and regulating the rate of discharge of the same, a conduit into which said materials are discharged by said means, a conveying conduit communicating with the last named conduit, and a second conduit for fluid under pressure communicating therewith and constructed to project said fluid under pressure against the materials a they pass into said second conduit and to propel them along the same, and means for supplying liquid to said materials as they pass along said conveying conduit in peripheral jets.

5. The combination of a retort provided with inlet and outlet openings for loose materials, means for closing said inlet opening, a conduit for fluid under pressure communicating with said retort, mechanical means for positively discharging said materials from said retort and regulating the rate of discharge of the same, a downwardly extending and tapering conduit into which said materials are discharged by said means, a conveying conduit communicating with the last named conduit, said downwardly extending conduit constructed to permit said materials to pass therethrough by gravity and to fall into said conveying conduit, and a second conduit for fluid under pressure communicating therewith and constructed to project said fluid under pressure against the materials as they pass into said second conduit and to propel them along the same.

6. The combination of a retort provided with inlet and outlet openings for loose materials, means for closing said inlet opening, a conduit for fluid under pressure communicating with said retort, mechanical means for discharging said materials from said retort and regulating the rate of discharge of the same, a conduit into which said materials are discharged by said means, a conveying conduit communicating with the last named conduit, and a second conduit for fluid under pressure communicating therewith and constructed to project said fluid under pressure against the materials as they pass into said second conduit and to propel them along the same, and means for supplying liquid to said materials as they pass along said conveying conduit in peripheral jets, said hydrating means comprising slots in said conduit arranged circumferentially and means for regulating the size of said slots and the size of the jets discharged therethrough.

7. The herein described method or process of mixing, hydrating and conveying cement or the like which consists in placing cement and other loose materials in a retort, creating air pressure in said retort, discharging said materials therefrom at a predetermined rate while maintaining the said air pressure thereon, then permitting the said materials to fall into a conduit, subjecting them to a blast of air as they fall thereinto, excluding the outside atmosphere from said materials during these steps and interrupting communication between the interior of the retort and the conveying conduit during the said discharge of the materials, and propelling them along said conduit with entrained air by said jet, and subjecting them to a peripheral jet of water directed thereinto at a predetermined rate at an angle to their line of travel while in said state.

Witness my hand this 12th day of September, 1916, at the city of New York, in the county and State of New York.

LEWIS H. EICHELBERGER.

UNITED STATES PATENT OFFICE.

HERBERT A. FOLSOM, OF PROVIDENCE, RHODE ISLAND.

SOLVENT FOR DYESTUFFS.

1,379,175.   Specification of Letters Patent.   Patented May 24, 1921.

No Drawing.   Application filed February 25, 1921.   Serial No. 447,834.

*To all whom it may concern:*

Be it known that I, HERBERT A. FOLSOM, a citizen of the United States, residing at Providence, in the county of Providence and State of Rhode Island, have invented certain new and useful Improvements in Solvents for Dyestuffs, of which the following is a specification.

My invention relates to solvents for coloring matter.

Certain colors, such as vat colors and sulfur colors are insoluble in water. It is necessary, in order that these colors be used to dye a material, that they be made soluble. It is also important that colors after being dissolved be maintained in solution.

To the above ends essentially my invention consists in such materials and in such combinations of materials, and in such steps and combinations of steps as fall within the scope of the appended claims.

I have discovered that sulfite liquor, which occurs as a by-product in the sulfite process of paper pulp manufacture, is a suitable agent for dissolving and blending vat colors and sulfur colors for dyeing and printing. By vat colors is meant indigo, indigo and anthracene derivatives, and modifications of the derivatives.

In utilizing my invention any one of the enumerated coloring matters, either in powder or paste form, is subjected to the action of sulfite waste liquor in alkaline solution. The sulfite waste liquor employed is the by-product of the sulfite process of paper pulp manufacture. Alkaline herein refers to any alkali or salt having an alkaline action. The amount of the sufite liquor and the amount and kind of alkali may be varied with advantage in the treatment of individual coloring matters, and upon different materials.

The following is an illustrative formula for dissolving synthetic indigo or a vat color of indigo derivation: By weight, 2 parts sulfite waste liquor, on dry basis, dissolved in 5 parts water; into which is stirred 1 part granulated caustic soda, first, and then 2 parts of 100% indigo or indigo derivative. This mixture is stirred and heated to about 135 degrees Fahrenheit, and then diluted and cooled to a volume of 20 parts and a temperature of about 110 degrees which completes the dye liquor.

I claim:—

1. As a solvent for vat colors and sulfur colors, a sulfite waste liquor in alkaline solution.

2. A process of dissolving vat colors and sulfur colors consisting in mixing the color to be dissolved with water, an alkali, and a sulfite waste liquor.

In testimony whereof I have affixed my signature.

HERBERT A. FOLSOM.